United States Patent
Hsieh et al.

(10) Patent No.: US 7,946,746 B2
(45) Date of Patent: May 24, 2011

(54) SURFACE LIGHT SOURCE DEVICE

(75) Inventors: Shu-Hui Hsieh, Miao-Li Hsien (TW);
Jyh-Ming Chen, Miao-Li Hsien (TW);
Chih-Ming Lai, Miao-Li Hsien (TW)

(73) Assignee: Foxsemicon Intergrated Technology, Inc., Chu-Nan, Mia-Li Hsien (TW)

( * ) Notice: Subject to any disclaimer, the term of this patent is extended or adjusted under 35 U.S.C. 154(b) by 407 days.

(21) Appl. No.: 12/192,341

(22) Filed: Aug. 15, 2008

(65) Prior Publication Data
US 2009/0086486 A1    Apr. 2, 2009

(30) Foreign Application Priority Data
Sep. 28, 2007 (CN) .......................... 2007 1 0201891

(51) Int. Cl.
*F21V 8/00* (2006.01)

(52) U.S. Cl. ......... 362/612; 362/616; 362/602; 362/812

(58) Field of Classification Search ............... 362/612, 362/602, 616, 621, 812; 385/89, 146, 147; 40/605
See application file for complete search history.

(56) References Cited

U.S. PATENT DOCUMENTS

| | | | | |
|---|---|---|---|---|
| 6,488,385 | B2* | 12/2002 | Reithmeier | 362/600 |
| 6,629,772 | B2* | 10/2003 | Brunfeld | 362/582 |
| 7,408,707 | B2* | 8/2008 | Yeo et al. | 359/452 |
| 7,780,306 | B2* | 8/2010 | Hoshi | 362/97.1 |
| 2006/0007369 | A1 | 1/2006 | Jin et al. | |
| 2007/0247871 | A1* | 10/2007 | Yoo | 362/612 |

FOREIGN PATENT DOCUMENTS
CN    1674058 A    9/2005

* cited by examiner

*Primary Examiner* — Sharon E Payne
(74) *Attorney, Agent, or Firm* — Andrew C. Cheng (57) ABSTRACT

A surface light source device includes a plurality of light guide plates spliced together side by side and forming a plurality of jointing interfaces. A plurality of LEDs is attached to a side face of each of the light guide plates. The LEDs are arranged in a linear LED array along the side face of each of the light guide plates. At most one linear LED array is arranged at the jointing interface between each two neighboring light guide plates.

4 Claims, 9 Drawing Sheets

SURFACE LIGHT SOURCE DEVICE

BACKGROUND

1. Field of the Invention

The present invention relates generally to surface light source devices, and particularly to a surface light source device with light emitting diodes (LEDs).

2. Description of related art

With features of long-term reliability, small size, environment friendliness and low power consumption, presently, LEDs are widely used as backlight source of liquid crystal display (LCD) devices, automobiles lights, and common luminous sources and so on.

LEDs are generally used in a surface light source device as a backlight source in an LCD device. The surface light source device comprises a light guide plate and a plurality of LEDs attached to the light guide plate. According to positions where the LEDs are mounted on the light guide plate, the surface light source devices are generally categorized to edge lighting mode and bottom lighting mode. In the edge lighting mode, the LEDs are attached to an edge of the light guide plate. In the bottom lighting mode, the LEDs are attached to a bottom of the light guide plate. With the development of electronic industry, large area light source with large light guide plate is needed. However, the surface light source device with the edge lighting mode is not suitable for large light guide plate to provide sufficient light. The surface light source device with the bottom lighting mode suit for large light guide plate to provide sufficient light, but in this mode, more LEDs are needed to emit light, which inevitably increase cost thereof.

What is needed, therefore, is a surface light source device with LEDs having a large light area and a low cost.

SUMMARY OF THE INVENTION

A surface light source device in accordance with a first embodiment of the present invention comprises a plurality of light guide plates spliced together side by side and forming a plurality of jointing interfaces. A plurality of LEDs is attached to a side face of each of the light guide plates. The LEDs are arranged in a linear LED array along the side face of each of the light guide plates. At most one linear LED array is arranged at the jointing interface between each two neighboring light guide plates.

BRIEF DESCRIPTION OF THE DRAWINGS

Many aspects of the present surface light source device with LEDs can be better understood with reference to the following drawings. The components in the drawings are not necessarily drawn to scale, the emphasis instead being placed upon clearly illustrating the principles of the present performance testing apparatus for heat pipes. Moreover, in the drawings, like reference numerals designate corresponding parts throughout the several views.

DETAILED DESCRIPTION OF THE INVENTION

Referring to FIGS. 1-3 and 6, a surface light source device 100 in accordance with a first embodiment is shown. The device 100 comprises four light source units 120 splicing together.

Each light source unit comprises a light guide plate 122 and a plurality of LEDs 124 attached to the light guide plate 122.

Figure 1:
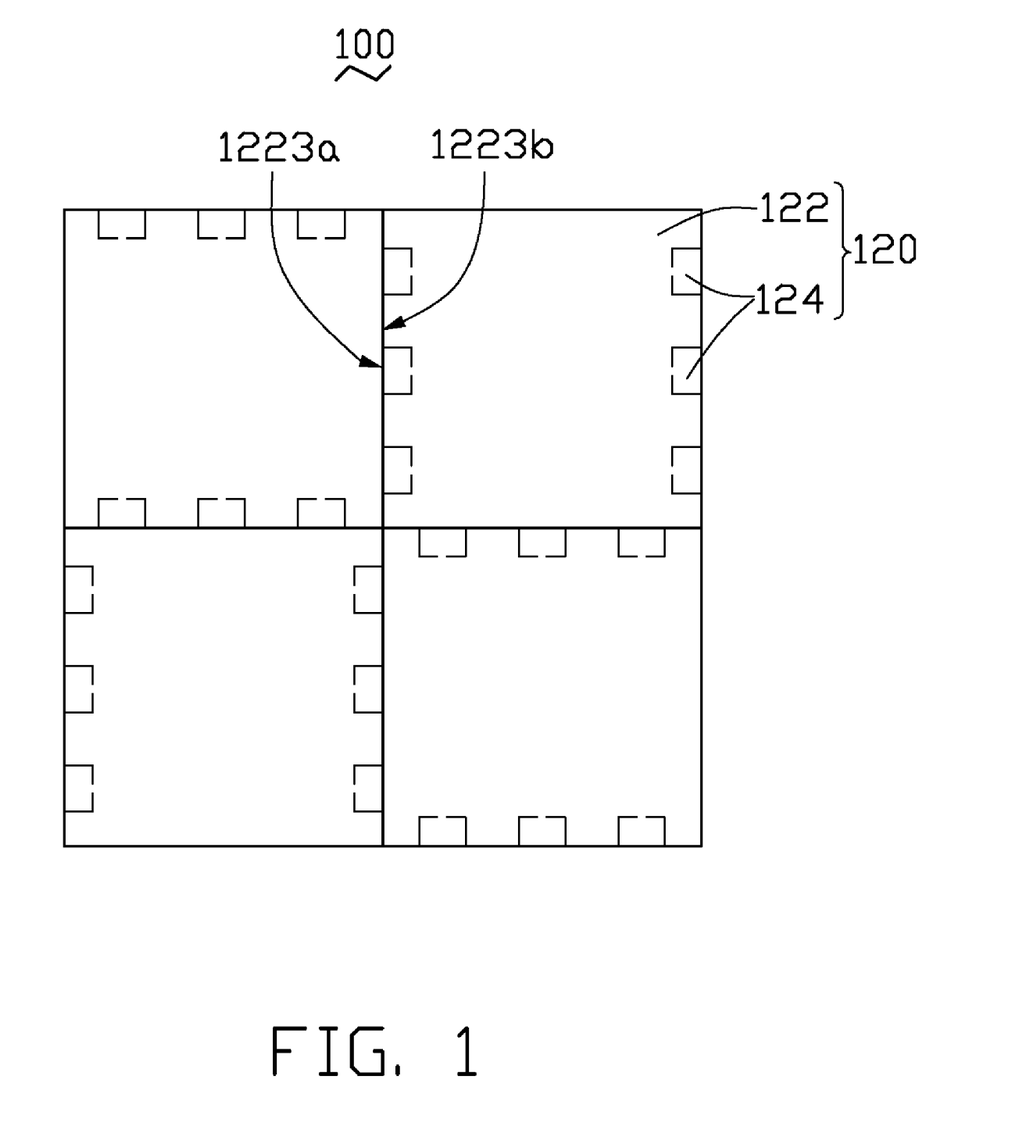
FIG. 1 is a plan view of a surface light source device in accordance with a first embodiment of the present invention.

The light guide plate 122 comprises a light emitting face 1222, a bottom face 1224 opposite to the light emitting face 1222, and a side face 1223 interconnecting the light emitting face 1222 and the bottom face 1224. In FIG. 1, the light guide plate 122 is a rectangular plate. The side face 1223 comprises four interconnecting portions: two parallel opposite splicing faces 1223a and two opposite mounting faces 1223b. Each splicing face 1223a is a flat face. Each mounting face 1223b is a flat face, and therein evenly defines three concaves 123 toward a center of the light guide plate 122. Each concave 1223b is defined in a position where the mounting face 1223b joints the bottom face 1224, in this manner, a dark zone formed at a joint of two adjacent mounting faces 1223b of the surface light source device 100 is eliminated.

Figure 3:
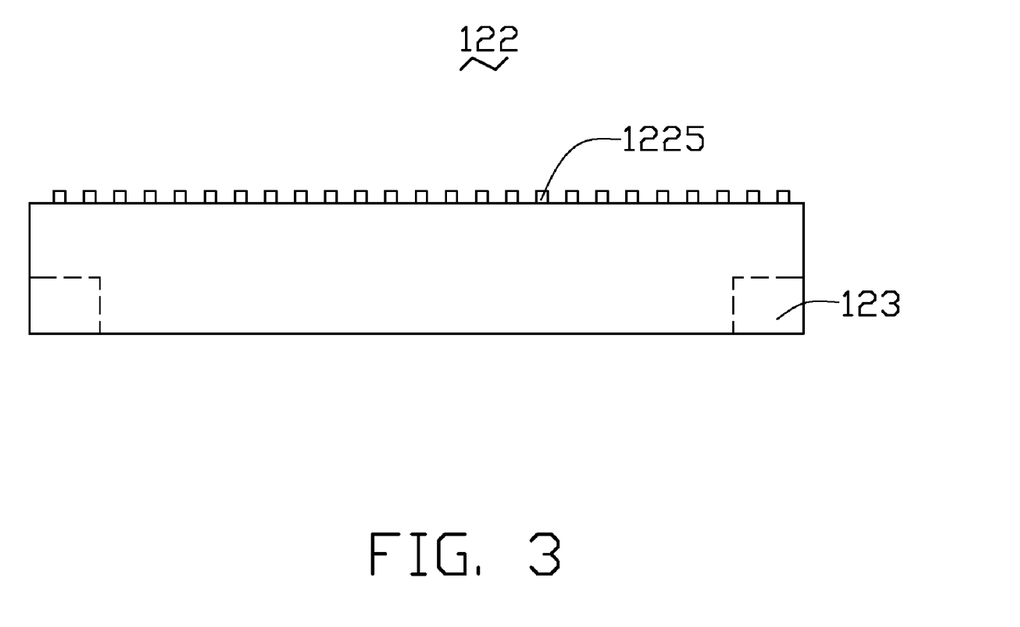
FIG. 3 is a plan view of a light guide plate of the light source unit of FIG. 2.
Figure 4:
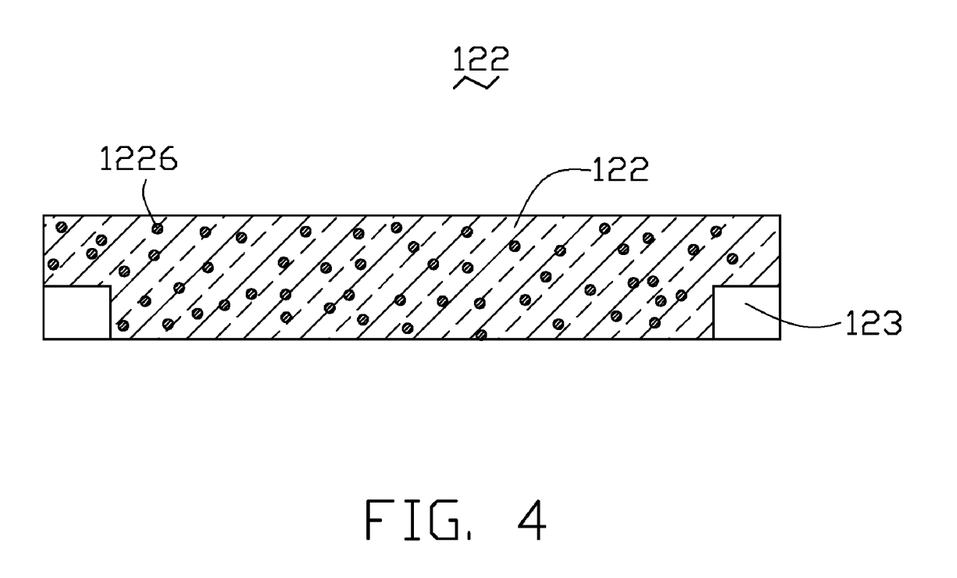
FIG. 4 is a section view of an alternative light guide plate taking along a line III-III of FIG. 2.
Figure 5:
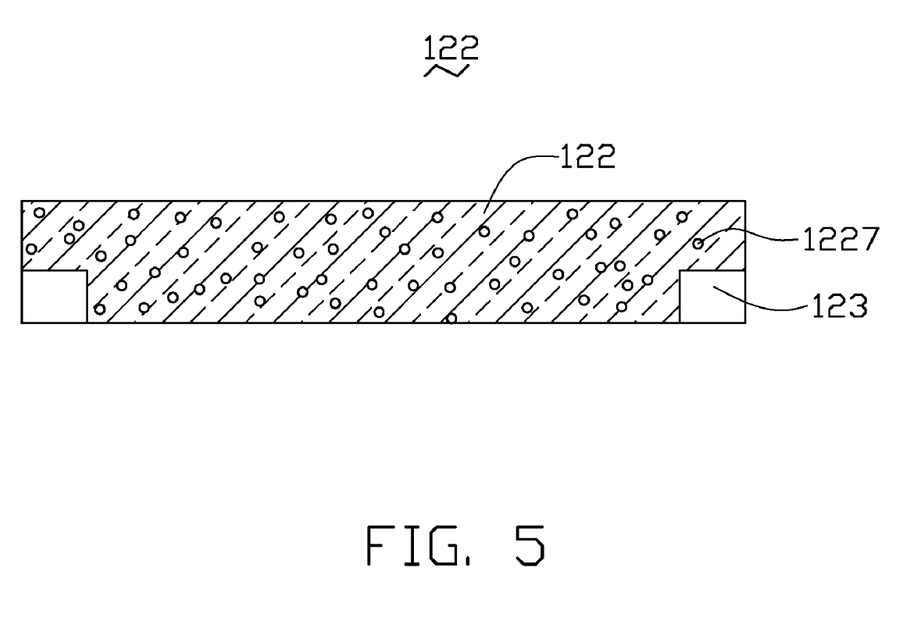
FIG. 5 is a section view of an additional light guide plate taking along the line III-III of FIG. 2.

Each light guide plate 122 can be made of polymethyl methacrylate, polycarbonate, polyacrylate, glass, silicone, quartz, epoxy and other transparent materials. The light guide plate 122 forms a plurality of micro-structures to realize a uniformity of light emitted from the LEDs 124. In FIG. 3, the micros-structures are a plurality of mini protrudes 1225 evenly distributed on the light emitting face 1222 of the light guide plate 122. In FIG. 4, the micro-structures are a plurality of particulates 1226, with a refractive index different from that of the light guide plate 122, adulterated in the light guide plate 122. The particulates 1226 are selected from titanium dioxide ($TiO_2$), aluminum oxide ($AL_2O_3$), silicon dioxide ($SiO_2$), zine oxide ($ZnO_2$), or other dielectric materials. Alternatively, in FIG. 4, the micro-structures consist of a plurality of material defects 1226, with a refractive index different from that of the light guide plate 122, formed in the light guide plate 122 by laser or other high power electromagnetic waves. In FIG. 5, the micro-structures are a plurality of cavities 1227 formed in the light guide plate 122.

Figure 2:
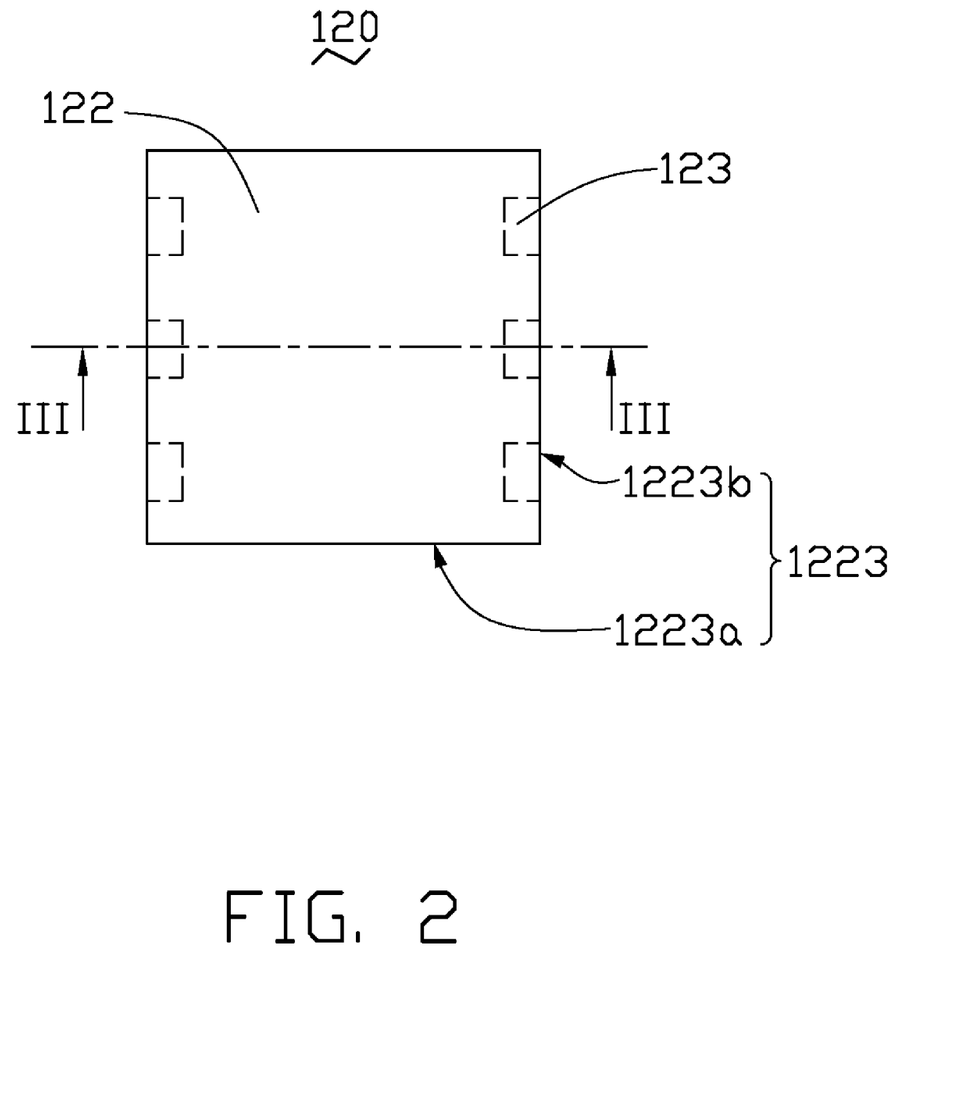
FIG. 2 shows a light source unit of the surface light source device of FIG. 1.
Figure 6:
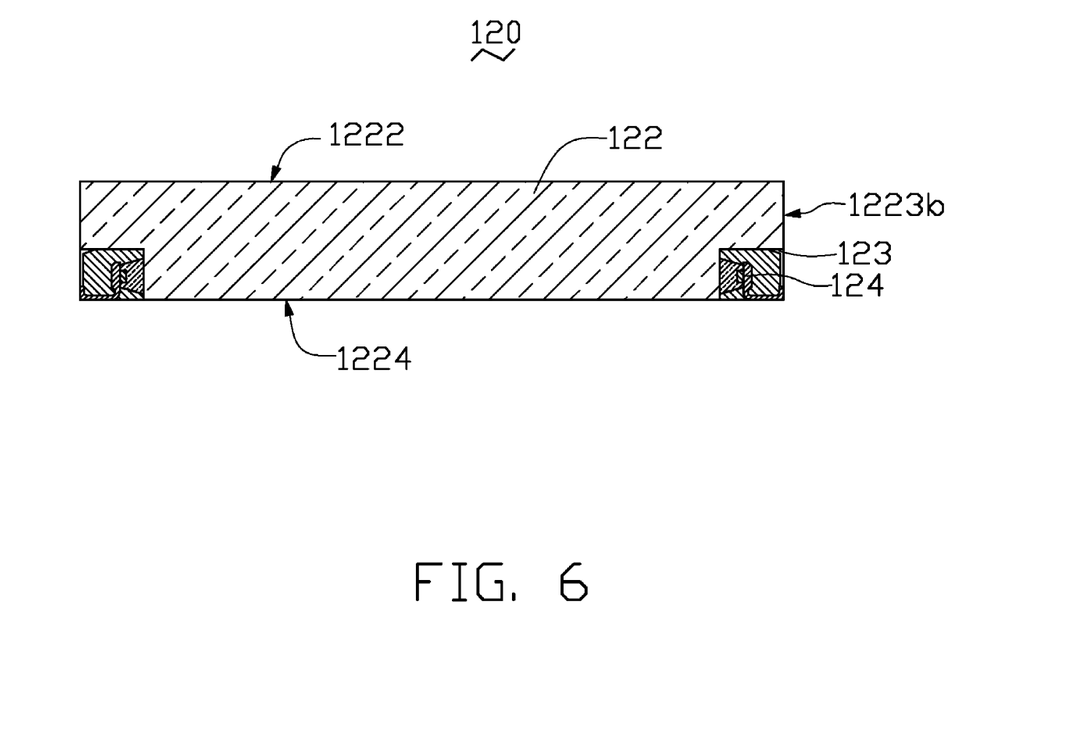
FIG. 6 is a section view of the light source unit taking along the line III-III of FIG. 2.

The LEDs 124 are received in the concaves 123 of the light guide plates 122, respectively, by adhesive or other means. The LEDs on each mounting face 1223b forms a linear array thereon. Each LED array has a light emitting face facing to the light guide plate 122. The light emitting faces of the two LED arrays of each light source unit 120 have normal thereof opposite and parallel to each other. In this embodiment, the LEDs 124 are side emitting LEDs, thereby producing a light coupling into the light guide plate 122.

In the surface light source device 100, the four light source units 120 are splicing together via one of the splicing faces 1223a of each light source unit 120 splicing with one of the mounting faces 1223b of an adjacent one of the four light source units 120. A jointing position is formed between two adjacent light source units 120. In this manner, only one LED array is located at the jointing position between two adjacent light source units 120, which facilitates heat dissipation from the jointing positions to avoid heat accumulation at the jointing positions of the surface light source devices 100.

Figure 7:
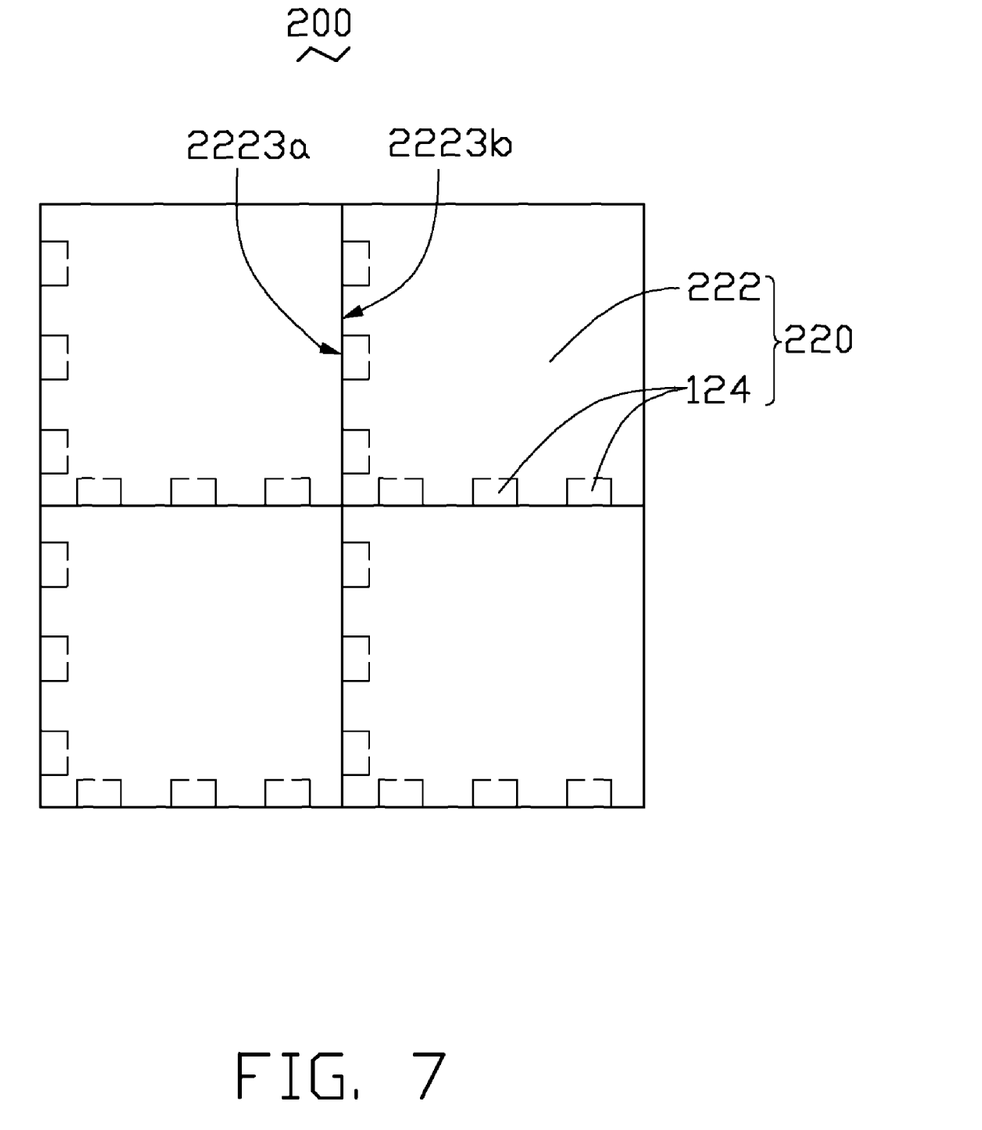
FIG. 7 is a plan view of a surface light source device in accordance with a second embodiment of the present invention.

Referring to FIG. 7, a surface light source device 200 in accordance with a second embodiment of the present invention is shown. The device 200 has a configuration similar to that of the device 100 of the first embodiment, a difference therebetween is that a light guide plate 222 of each light source unit 220 of the device 200 has two adjacent mounting faces 2223b and two adjacent splicing faces 2223a. The LEDs 124 are attached to the mounting faces 2223b of the light guide plates 222. The LEDs 124 on each mounting face 2223b form a linear array thereon. Each LED array has a light emitting face facing to the light guide plate 222. The light emitting faces of the two LED arrays of each light source unit 220 have normal thereof crossed with each other, for example, two normal of the two LED arrays are perpendicular to each other.

Figure 8:
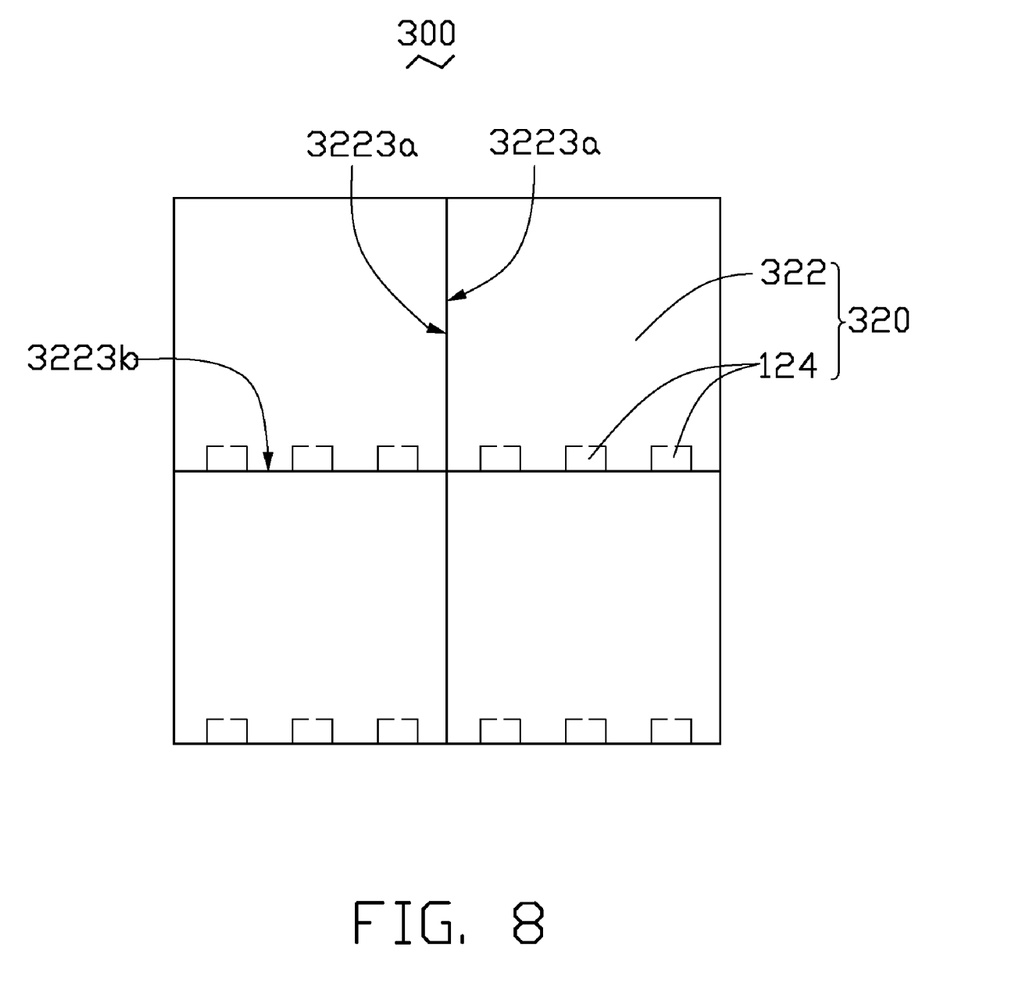
FIG. 8 is a plan view of a surface light source device in accordance with a third embodiment of the present invention.

Referring to FIG. 8, a surface light source device 300 in accordance with a third embodiment of the present invention is shown. The device 300 has a configuration similar to that of the device 100 of the first embodiment, a difference therebetween is that a light guide plate 322 of each light source unit 320 of the device 300 has a mounting face 3223b and three splicing faces 3223a. The LEDs 124 are attached to the mounting face 3223b of the light guide plates 322. The LEDs 124 on each mounting face 3223b form a linear array thereon. In the device 300, the four light source units 320 are splicing together via one of the splicing faces 3223a of each light source unit 320 splicing with the mounting face 3223b or one of the splicing faces 3223a of an adjacent one of the four light source units 320. In this embodiment, only one or no LED array is located at the jointing position between two adjacent light source units 320.

Figure 9:
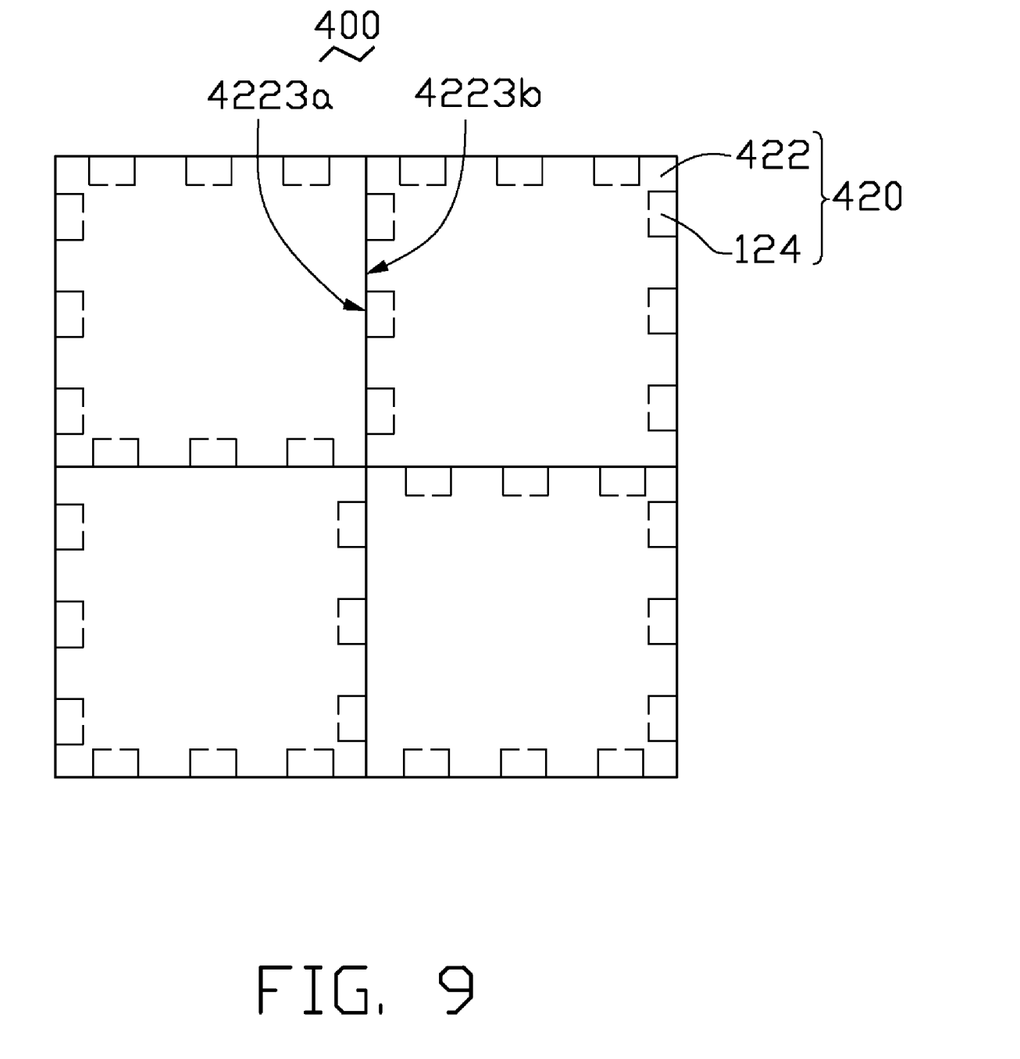
FIG. 9 is a plan view of a surface light source device in accordance with a fourth embodiment of the present invention.

Referring to FIG. 9, a surface light source device 400 in accordance with a fourth embodiment of the present invention is shown. The device 400 has a configuration similar to that of the device 100 of the first embodiment, a difference therebetween is that a light guide plate 422 of each light source unit 420 of the device 400 has three mounting faces 4223b and a splicing face 4223a. The LEDs 124 are attached to the mounting faces 4223b of the light guide plates 422. The LEDs 124 on each mounting face 4223b form a linear array thereon. Each LED array has a light emitting face facing to the light guide plate 422. Two of the three light emitting faces of the three LED arrays of each light source unit 420 have normal thereof opposite and parallel to each other and crossed with a normal of another of the three light emitting faces. In the device 400, the four light source units 420 are splicing together via each splicing faces 4223a of each light source unit 420 splicing with one of the mounting faces 4223b of an adjacent one of the four light source units 420.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A surface light source device comprising:
   at least four light guide plates each being rectangular in shape and comprising a light emitting face, a bottom face opposite to the light emitting face, and four side faces interconnecting the light emitting face and the bottom face, the four side faces of each light guide plate comprising at least two mounting faces and at least a splicing face, the at least four light guide plates being spliced together by the at least a splicing face of one of the at least four light guiding plates being closely adjacent to one of the at least two mounting faces of a neighboring one of the at least four light guiding plates, at least two neighboring ones of the four side faces of each light guide plate each being closely adjacent to a corresponding side face of one of two neighboring guiding plates of the each light guide plate; and
   a plurality of LEDs attached in each of the at least two mounting faces of each of the at least four light guide plates, the LEDs in each of the at least two mounting faces being arranged in a line, the at least a splicing face being without any LED therein.

2. The surface light source device of claim 1, wherein the at least two mounting faces of each light guide plate comprise two mounting faces opposite to each other and the at least a splicing face of each light guide plate comprises two splicing faces opposite to each other.

3. The surface light source device of claim 1, wherein the at least two mounting faces of each light guide plate comprise two mounting faces neighboring each other and the at least a splicing face of each light guide plate comprises two splicing faces neighboring each other.

4. The surface light source device of claim 1, wherein the at least two mounting faces of each light guide plate comprise two mounting faces opposite each other and another mounting face between the two mounting faces and the at least a splicing face of each light guide plates comprises a splicing face opposite the another mounting face.

* * * * *